US008590169B2

(12) United States Patent
Holmquist

(10) Patent No.: US 8,590,169 B2
(45) Date of Patent: Nov. 26, 2013

(54) MILITARY RIBBON TEMPLATE

(76) Inventor: Michelle R. Holmquist, Hubert, NC (US)

( * ) Notice: Subject to any disclaimer, the term of this patent is extended or adjusted under 35 U.S.C. 154(b) by 326 days.

(21) Appl. No.: 13/040,985

(22) Filed: Mar. 4, 2011

(65) Prior Publication Data

US 2012/0223036 A1 Sep. 6, 2012

(51) Int. Cl.
*A44C 3/00* (2006.01)
*G01D 21/00* (2006.01)

(52) U.S. Cl.
USPC .................... 33/653; 33/563; 33/566; 40/1.5

(58) Field of Classification Search
USPC .................. 40/1.5, 1.6; 33/653, 563; D10/64
See application file for complete search history.

(56) References Cited

U.S. PATENT DOCUMENTS

| | | | | | |
|---|---|---|---|---|---|
| 2,387,986 | A | * | 10/1945 | Evans | 33/653 |
| 2,495,577 | A | | 1/1950 | Elkies | |
| 2,795,876 | A | | 6/1957 | Hayes | |
| 2,821,787 | A | | 2/1958 | Shepard | |
| 2,832,161 | A | | 4/1958 | Murphy | |
| 2,847,773 | A | | 8/1958 | Herrick | |
| D191,049 | S | | 8/1961 | De Grazia | |
| 3,192,655 | A | | 7/1965 | Harn | |
| 3,579,881 | A | | 5/1971 | Cherry | |
| 3,942,273 | A | | 3/1976 | Adams | |
| 4,302,884 | A | | 12/1981 | Pallone | |
| 4,598,482 | A | * | 7/1986 | Castleton | 33/482 |
| 4,916,827 | A | * | 4/1990 | Rayburn | 33/563 |
| 5,063,684 | A | * | 11/1991 | Winters | 33/653 |
| 7,096,614 | B1 | * | 8/2006 | Williams | 40/1.5 |
| 7,559,153 | B2 | * | 7/2009 | Allen | 33/653 |
| 7,877,907 | B1 | * | 2/2011 | Hudick | 40/1.5 |
| 8,359,763 | B2 | * | 1/2013 | Allen | 33/653 |
| 2005/0011092 | A1 | | 1/2005 | Bruscini | |
| 2006/0137229 | A1 | | 6/2006 | Jordan | |

* cited by examiner

*Primary Examiner* — Casandra Davis
(74) *Attorney, Agent, or Firm* — Richard C Litman

(57) ABSTRACT

The military ribbon template is a tool for the mounting of military awards on corresponding military award ribbons. The military ribbon template includes a plate having a plurality of horizontal rows of rectangular slots formed therethrough. Each rectangular slot is configured for securely receiving an award ribbon. A first set of indicia is formed on the plate, including first sub-sets of indicia, with each first sub-set of indicia corresponding to one of the rows of slots and including an indicator corresponding to a number of awards to be mounted on the award ribbon. Additionally, a second set of indicia are formed on the plate, above each rectangular slot, and the second set of indicia includes second sub-sets of indicia, respectively indicating the type of award to be mounted on the ribbon, the number of awards, and graduations indicating the proper position of the award to be mounted on the ribbon.

4 Claims, 1 Drawing Sheet

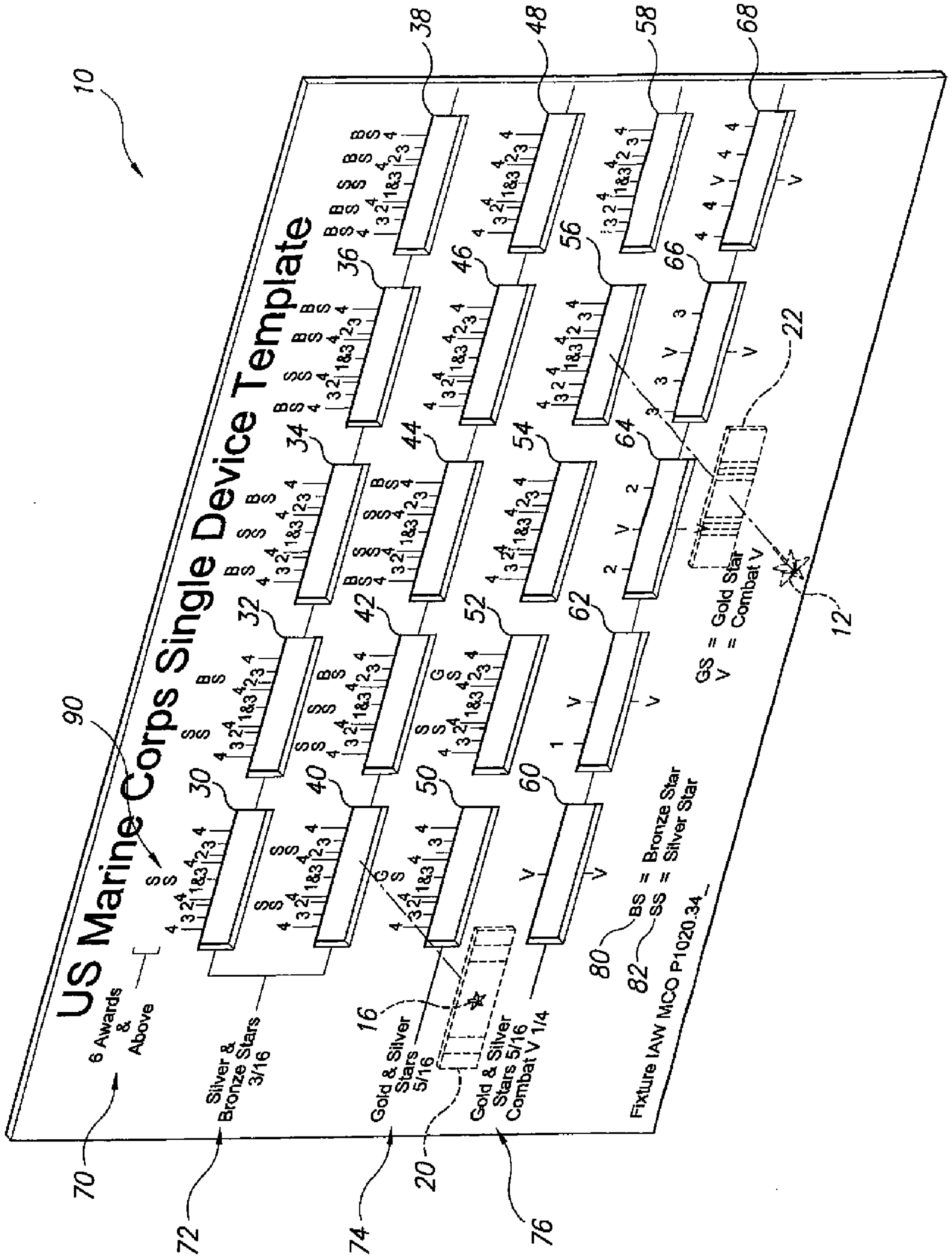
US Marine Corps Single Device Template
6 Awards & Above
Silver & Bronze Stars 3/16
Gold & Silver Stars 5/16
Gold & Silver Stars 5/16 Combat V 1/4
BS = Bronze Star
SS = Silver Star
GS = Gold Star
V = Combat V
Fixture IAW MCO P1020.34

MILITARY RIBBON TEMPLATE

BACKGROUND OF THE INVENTION

1. Field of the Invention

The present invention relates to military decorations and regalia, and particularly to a military ribbon template for mounting military service awards to military ribbons.

2. Description of the Related Art

In the United States, formal events and ceremonies for members of the military branches, police, fire, and other civil service career service organizations often require the donning of formal uniforms, including the display of any commendations obtained in the line of duty. This tradition is particularly prevalent in the military, where formal uniform apparel is commonly worn. Military decoration is typically worn for inspections, on the uniform of the day, at historic anniversaries of battles, ceremonies associated with historical monuments, military reunions, or other formal gatherings.

The display of any medals, ribbons or badges is strictly regulated by the military and other service members. These regulations also extend to retired military personnel, who may take pride in such displays of their ribbons. In particular, regulations exist which pertain to the spacing and positioning of the awards on the military ribbon. Although each military ribbon is a standard shape and size, the positioning of the additional awards thereon may be difficult. In practice, depending on the number of earned awards, it can take a considerable amount of time to correctly comply with the various specifications and regulations regarding the placement and spacing of the awards on the ribbons. Incorrect placement is not in compliance with regulations and common practice, particularly in military applications. The proper positioning and placement of such awards is often both inefficient and time consuming.

For active service members, the addition of new awards may necessitate an entirely different arrangement or set of spacing requirements. Additionally, retired service members who have misplaced or lost their ribbons and awards commonly seek new ones to replace lost honors. The positioning of the various stars on the ribbons, along with other awards, may be difficult for those of advanced ages, or who are otherwise disabled or infirm. Thus, a military ribbon template solving the aforementioned problems is desired.

SUMMARY OF THE INVENTION

The military ribbon template is a tool for the mounting of military awards, such as stars or the like, on corresponding military award ribbons. The military ribbon template includes a plate having a plurality of horizontal rows of substantially rectangular slots formed therethrough. Each substantially rectangular slot is configured for securely receiving an award ribbon. A first set of indicia is formed on a front face of the plate. The first set of indicia include first sub-sets of indicia, with each first sub-set of indicia corresponding to one of the horizontal rows of substantially rectangular slots and including an indicator corresponding to a number of awards to be mounted on the award ribbon. Additionally, a second set of indicia is formed on the front face of the plate. The second set of indicia is formed above each substantially rectangular slot, and the second set of indicia includes second sub-sets of indicia, with the second sub-sets of indicia respectively including indicia indicating the type of award to be mounted on the award ribbon, the number of awards to be mounted on the award ribbon, and graduated markings indicating the proper position of the award to be mounted on the award ribbon.

These and other features of the present invention will become readily apparent upon further review of the following specification and drawing.

BRIEF DESCRIPTION OF THE DRAWING

The sole drawing FIGURE is a perspective view of a military ribbon template according to the present invention.

DETAILED DESCRIPTION OF THE PREFERRED EMBODIMENTS

Referring to the sole drawing FIGURE, the military ribbon template 10 is a tool used for the mounting of military awards (such as exemplary stars 12 and 16) or other decorations to a military award ribbon, such as exemplary ribbons 20, 22, respectively. Although template 10 may have any desired shape or relative dimensions, the exemplary template 10 of the sole FIGURE is shown in the form of a substantially rectangular plate having a plurality of substantially rectangular slots 30, 32, 34, 36, 38, 40, 42, 44, 46, 48, 50, 52, 54, 56, 58, 60, 62, 64, 66, and 68 formed therethrough. The plate may be made from any suitable rigid material, such as 1/16 of an inch thick Gravoply Ultra, which is a laminated plastic manufactured by Gravograph, Inc. of Duluth, Ga., having a microcap engraving surface suitable for either rotary or laser-engraving.

Arranged in predefined rows on the rectangular shaped template 10, a first set of indicia 70, 72, 74, 76 is engraved on the plate to the left of the first slot 30, 40, 50, 60 of each of the horizontal rows, with the first set of indicia being provided for the identification of each of the horizontal rows. Each of the slots 30, 32, 34, 36, 38, 40, 42, 44, 46, 48, 50, 52, 54, 56, 58, 60, 62, 64, 66, and 68 is dimensioned and configured to securely receive a ribbon 20, 22. The first set of indicia 70, 72, 74, 76 is provided to indicate to the user which horizontal row is appropriate for receiving a particular ribbon 20, 22.

The first horizontal set or row of slots 30, 32, 34, 36, 38 are provided for receiving military ribbons that will have mounted thereon five or more awards, such as Bronze Stars (BS), generally indicated in the sole FIGURE by the number 80, or Silver Stars (SS), generally indicated with the number 82. The second horizontal row of slots 40, 42, 44, 46, 48 receives those military ribbons that will have mounted thereon at least one Bronze Star 80 or Silver Star 82. The third horizontal row of slots 50, 52, 54, 56, 58 is provided for receiving those military ribbons that will receive at least one Silver Star 82. The fourth horizontal row of slots 60, 62, 64, 66, 68 is provided for receiving military ribbons of Valor, Oak Leaf Clusters, Gold Stars, or Hour Glass awards. Each of the slots, as noted above, has a length and width to securely receive the corresponding rectangular ribbon. Military ribbons, in particular, are typically provided in a standard size and shape, allowing the slots of template 10 to be formed with predefined dimensions and configuration to securely receive the ribbons.

Additionally, a second set of indicia 90 is preferably formed on template 10. The second set of indicia 90 is preferably engraved in the plate above each of the slots 30, 32, 34, 36, 38, 40, 42, 44, 46, 48, 50, 52, 54, 56, 58, 60, 62, 64, 66 and 68. The second set of indicia 90 identifies a position for aligning the particular military award 12, 16 on the rectangular ribbon 20, 22 with the indicia 90, including vertical lines that identify an exact proper placement of the award on the ribbon. Formed above each vertical line is a number indicating the particular number of stars or other awards to be mounted on the ribbon. The second set of indicia 90 is made up of letters, vertical lines and numbers. The lettering conforms to the type of award, the numbers indicate how many awards are mounted on a particular ribbon, and the vertical lines illustrate to the user the proper position of each of the awards 12, 16 on the ribbons 20, 22.

In the example illustrated in the drawing, exemplary ribbons 20, 22 are placed inside the designated slots 50, 56 within the template 10. Once the ribbons 20, 22 are placed in the respective slots 50, 56, the second set of indicia 90 provide guide marks above the slots 50, 56 to identify placement of the service awards 12, 16, respectively. In this example, multiple ribbons 20, 22 can be adjusted simultaneously. As a further example, if an individual has been awarded a particular award three times, and the service award is the Bronze Star 80, the ribbon 20 or 22 would be placed in one of the slots of the second horizontal row, and a Bronze Star 80 would be placed directly below the number "2" (of indicia 90) of the corresponding slot. The ribbons 20, 22 are single awards, and each star 12, 16 identifies an additional number of awards. Thus, if a service member receives three Bronze Stars, the service member would have one ribbon, such as ribbon 20, and two stars would be added, such as stars 12. Additionally, a third set of indicia may be provided, providing a key to the abbreviations used on template 10. For example, indicia 80 indicates that the Bronze Star is abbreviated as "BS" and indicia 82 indicates that the Silver Star is abbreviated as "SS". It should be understood that any desired indicia may be formed on template 10. Indicia may be engraved, imprinted or otherwise formed thereon using any desired method of indicia formation.

The template 10 may be used with any type of service ribbon, such as exemplary ribbons 20, 22, regardless of the branch of service. The template 10 allows the user to properly affix awards, such as stars 12, 16, to the military ribbons 20, 22 upon receipt of subsequent awards. Accordingly, each service member or retiree can easily prepare his or her own individual ribbons in accordance with their service's awards regulations. Thus, the template 10 prevents the service member from having to wear improper ribbon racks while waiting for another agency to properly prepare the award ribbons.

It is to be understood that the present invention is not limited to the embodiment described above, but encompasses any and all embodiments within the scope of the following claims.

I claim:

1. A military ribbon award placement template, comprising:

a plate having at least three horizontal rows of configured slots formed therethrough, each of the slots having an upper edge, a lower edge and first and second ends, each of the at least three rows having at least three configured slots, each of the slots being dimensioned and configured in substantially identical size and configuration, whereby a similarly shaped ribbon may be viewed when the template is placed thereover, the plate having a front face;

a first set of indicia formed on the front face of the plate, the first set of indicia including first subsets of indicia, each of the first subsets of indicia corresponding uniquely to a respective one of the horizontal rows of configured slots and being located adjacent their respective horizontal row, each of the first subsets of indicia further including an indicator corresponding to a number of awards to be mounted on the ribbon; and a second set of indicia formed on the front face of the plate, the second set of indicia being formed solely above each of the upper edges of the slots and being substantially equal in length to the upper edge, the second set of indicia including second subsets of indicia, the second subsets of indicia being unique from each other and includes: i) indicia indicating the type of award to be mounted on the ribbon, ii) the number of awards to be mounted on the ribbon, and iii) graduated markings indicating the proper position of the award to be mounted on the ribbon, wherein the graduated markings are identical throughout each of the slots.

2. The military ribbon template as recited in claim 1, wherein said plate is substantially rectangular.

3. The military ribbon template as recited in claim 1, wherein said plate is made from laminated plastic and has a microcap engraving surface for forming the indicia.

4. The military ribbon template as recited in claim 1, wherein each of said configured slots is substantially rectangular.

* * * * *